US012258769B2

(12) United States Patent
Buckland et al.

(10) Patent No.: US 12,258,769 B2
(45) Date of Patent: Mar. 25, 2025

(54) HINGE FOR SERVICING POLE-MOUNTED EQUIPMENT

(71) Applicant: Southco, Inc., Concordville, PA (US)

(72) Inventors: Stuart Buckland, Concordville, PA (US); Nicholas Bennett, Concordville, PA (US)

(73) Assignee: Southco, Inc., Concordville, PA (US)

(*) Notice: Subject to any disclaimer, the term of this patent is extended or adjusted under 35 U.S.C. 154(b) by 96 days.

(21) Appl. No.: 18/020,798

(22) PCT Filed: Aug. 12, 2021

(86) PCT No.: PCT/US2021/045688
§ 371 (c)(1),
(2) Date: Feb. 10, 2023

(87) PCT Pub. No.: WO2022/036057
PCT Pub. Date: Feb. 17, 2022

(65) Prior Publication Data
US 2023/0304315 A1 Sep. 28, 2023

Related U.S. Application Data

(60) Provisional application No. 63/065,187, filed on Aug. 13, 2020.

(51) Int. Cl.
*E04H 12/18* (2006.01)
*F16C 11/04* (2006.01)

(52) U.S. Cl.
CPC ............ *E04H 12/187* (2013.01); *F16C 11/04* (2013.01)

(58) Field of Classification Search
CPC .................................. E04H 12/187; F16C 11/04
See application file for complete search history.

(56) References Cited

U.S. PATENT DOCUMENTS 5,171,088 A * 12/1992 Tellier .................... F16M 11/10
362/233
5,634,759 A   6/1997 Jenvey
(Continued)

FOREIGN PATENT DOCUMENTS

CN          106401352 A    2/2017
EP            2031155 A2    3/2009
(Continued)

OTHER PUBLICATIONS

International Preliminary Report on Patentability and Written Opinion for International Application No. PCT/US2021/045688, issued Feb. 7, 2023, 16 pages.

(Continued)

*Primary Examiner* — Anita M King
(74) *Attorney, Agent, or Firm* — Buchanan Ingersoll & Rooney PC

(57) ABSTRACT

A controlled motion hinge assembly having a base with a first actuator mount, a pivot arm with a second actuator mount, a hinge pivotally connecting the base to the pivot arm to be movable between an extended position and a retracted position, and an actuator shaft. The shaft has a first end, a second end, and a threaded body extending between the first and second ends. The first end is configured to receive a drive torque about the actuator shaft axis. The second end is rotatably connected to the second actuator mount, but fixed thereto along the actuator shaft axis. The threaded body engages a threaded bore of the first actuator mount such that rotation of the body causes the first actuator mount to move along the actuator shaft axis. Also provided is a pole assembly, and a method for retrofitting a pole, with a controlled motion hinge.

27 Claims, 5 Drawing Sheets

(56) References Cited

U.S. PATENT DOCUMENTS

| | | | |
|---|---|---|---|
| 5,899,651 A | 5/1999 | Jenvey | |
| 2012/0286108 A1* | 11/2012 | Devine | H02G 1/04 248/65 |
| 2016/0203741 A1* | 7/2016 | White | G09F 7/18 248/544 |
| 2019/0147776 A1* | 5/2019 | White | G09F 7/18 248/544 |

FOREIGN PATENT DOCUMENTS

| | | |
|---|---|---|
| GB | 2205392 A | 12/1988 |
| GB | 2396631 A | 6/2004 |
| GB | 2551772 A | 1/2018 |
| WO | 2007104903 A1 | 9/2007 |

OTHER PUBLICATIONS

International Search Report and Written Opinion for International Application No. PCT/US2021/045688, dated Jan. 25, 2022, 19 pages.

\* cited by examiner

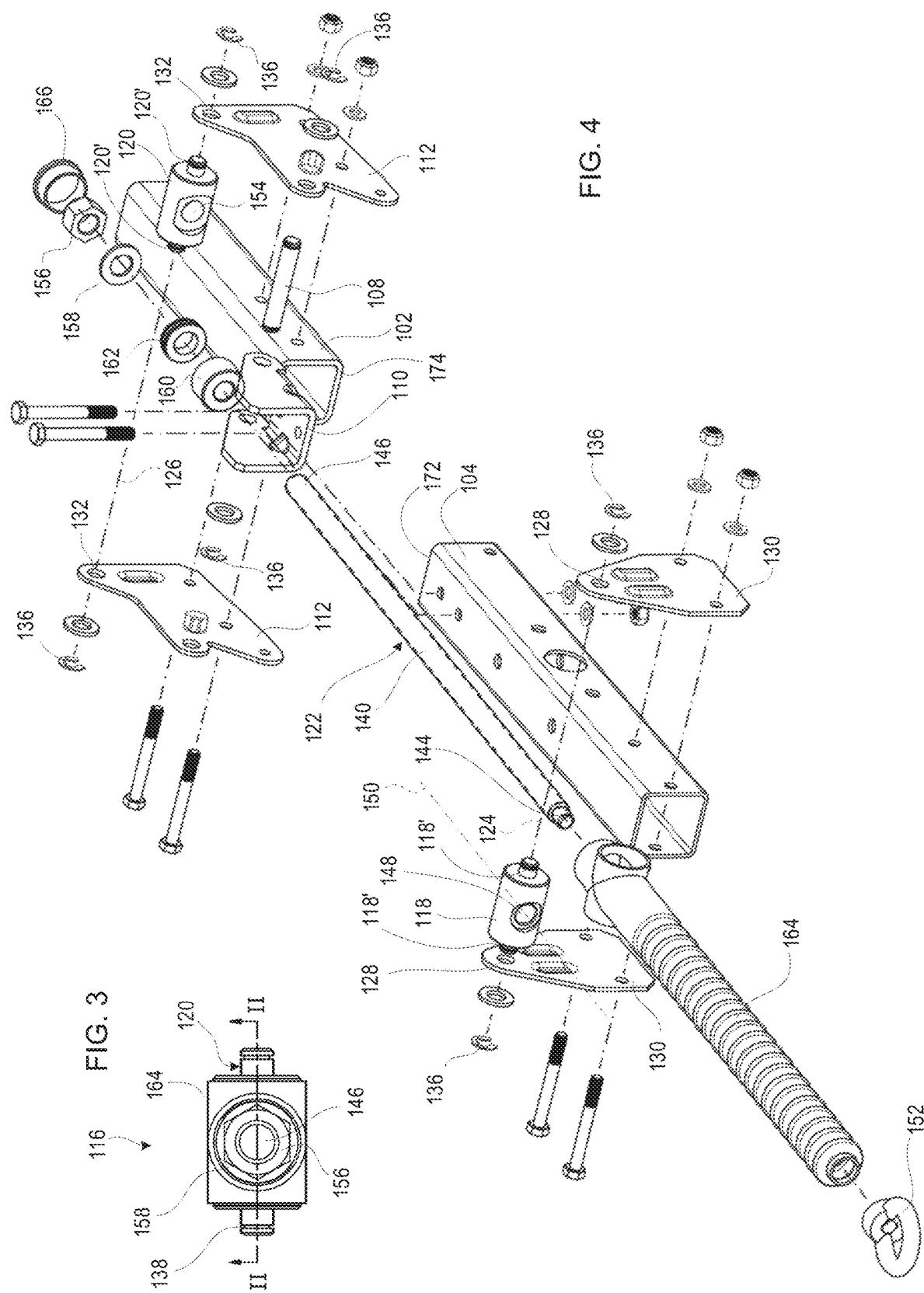

HINGE FOR SERVICING POLE-MOUNTED EQUIPMENT

CROSS-REFERENCE TO RELATED APPLICATIONS

This application is a U.S. National Phase application of PCT International Application No. PCT/US2021/045688, filed Aug. 12, 2021, which claims priority to U.S. Provisional Patent Application No. 63/065,187, filed on Aug. 13, 2020, titled "HINGE FOR SERVICING POLE-MOUNTED EQUIPMENT," both of which are incorporated by reference herein.

FIELD OF THE INVENTION

The present invention relates to the hinge systems for mounting lengths of poles together, and particularly to hinge systems for pole assemblies having a lower pole and an upper pole, wherein the hinge system is configured to allow an operator to retract the upper pole towards the ground to provide service to components mounted on the end of the upper pole.

BACKGROUND OF THE INVENTION

There is a longstanding necessity to place equipment of various types on poles. For example, it is often desired to mount signs, streetlights, surveillance equipment, and telecommunications equipment in high locations to better perform their various functions. When buildings or other existing structures are not available, a pole may be erected to hold the equipment. It is also common to retrofit existing equipment poles with new equipment. For example, a telecommunications antenna or security camera may be mounted on an existing streetlight pole, either directly or via an extension pole that is connected to rise above the existing pole.

Such pole-mounted equipment can be difficult to service.

In some cases, the pole may not have any access features, making it necessary to use a personnel lift (e.g., a bucket truck or elevator platform) to perform service. Such equipment can be dangerous to operate, particularly on uneven ground, and requires service costs associated with renting and/or operating the equipment. Personnel lifts also require special training for use. Using such equipment can also necessitate road closures, rerouting traffic, obtaining work permits, and other complexities and inconveniences.

In other cases, a pole may have an access feature that limits the need to use personnel lifts. For example, a pole might have a cable and pulley system to lower the equipment for servicing. Such systems often require powered equipment to raise and lower the equipment, and they are limited to the original height of the pole and cannot be used to service equipment that is mounted to the original pole by an extension pole.

The foregoing problems can be addressed, at least to some degree, by providing two-part poles having a pivot that can be operated at the ground level. For example, so-called base-hinged columns, such as the ones available from Abacus Lighting Ltd. in the United Kingdom, have a hinge located in close proximity to the ground—less than two meters—to allow a service technician to raise and lower the upper pole section from the ground. In such devices, the great majority of the assembly is located above the pivot point, and the weight of the upper pole and the attached equipment must be supported during raising and lowering. To address this problem, the pole may be provided with an external spring counterbalance or mechanical or hydraulic actuator, which is permanently attached to the pole, or only attached during lowering and raising. Examples of such devices are shown in U.S. Pat. Nos. 5,634,759 and 5,899,651, and UK Patent GB 2 205 392 B. In some other cases, the weight of the upper pole and equipment is managed by integrating a counterbalance into the pole, such as shown in UK Patent GB 2 396 631 B. As a general rule, base-hinged columns require additional equipment and training, and must be configured to provide protection against misuse by unauthorized users and vandals. For example, UK Patent GB 2 551 772 B provides a lock system to prevent unauthorized use of a base-hinged column. A further drawback of base-hinged columns is that they are only available as new installations, and are not intended to be used in conjunction with an existing pole.

It has been found that the state of the art of hinged columns can be improved.

SUMMARY

In a first exemplary aspect, there is provided a controlled motion hinge assembly having a base, a first actuator mount rotatably connected to the base to rotate about a first mount rotation axis, a pivot arm pivotally coupled to the base to pivot about an arm pivot axis that is parallel to the first mount rotation axis, a second actuator mount rotatably connected to the pivot arm to rotate about a second mount rotation axis that is parallel to and spaced from the arm pivot axis, and a hinge pivotally connecting the base to the pivot arm. The pivot arm is movable relative to the base about the arm pivot axis between an extended position in which the first mount rotation axis is spaced from the second mount rotation axis by a first distance, and a retracted position in which the first mount rotation axis is spaced from the second mount rotation axis by a second distance, the second distance being less than the first distance. An actuator shaft is provided to control the position of the pivot arm. The actuator shaft has a first shaft end, a second shaft end, and a threaded body extending along an actuator shaft axis between the first shaft end and the second shaft end. The first shaft end is configured to receive a drive torque about the actuator shaft axis. The second shaft end is connected to the second actuator mount to be rotatable about the actuator shaft axis at a fixed position along the actuator shaft axis. The threaded body is in threaded engagement with a threaded bore in the first actuator mount. The threaded bore extends along a bore axis that is perpendicular to the first mount rotation axis. The threaded body and threaded bore interact such that an application of the drive torque causes the first actuator mount to move along the actuator shaft axis towards and away from the second actuator mount, to thereby move the pivot arm towards the retracted position and the extended position, respectively.

In some exemplary embodiments of the controlled motion hinge assembly, the pivot arm is angularly displaced by more than 90 degrees about the arm pivot axis between the extended position and the retracted position.

In some exemplary embodiments of the controlled motion hinge assembly, the pivot arm is angularly displaced by at least 110 degrees about the arm pivot axis between the extended position and the retracted position.

In some exemplary embodiments of the controlled motion hinge assembly, the pivot arm is angularly displaced by at least 135 degrees about the arm pivot axis between the extended position and the retracted position.

In some exemplary embodiments of the controlled motion hinge assembly, the base and pivot arm are configured to be in contact at respective stop surfaces adjacent to the hinge when the pivot arm is in the extended position to thereby prevent rotation about the arm pivot axis beyond the extended position.

In some exemplary embodiments of the controlled motion hinge assembly, the base is configured to be secured to an adjacent structure with the arm pivot axis perpendicular to a gravitational direction.

In some exemplary embodiments of the controlled motion hinge assembly, the base is configured to be secured to an adjacent structure in a plurality of different orientations, with the arm pivot axis perpendicular to the gravitational direction in each of the plurality of different orientations.

In some exemplary embodiments of the controlled motion hinge assembly, the adjacent structure comprises a first pole extending in the gravitational direction.

In some exemplary embodiments of the controlled motion hinge assembly, the pivot arm is configured to be secured to a second pole such that the second pole is parallel to the first pole when the pivot arm is in the extended position.

In some exemplary embodiments of the controlled motion hinge assembly, the pivot arm is configured to be secured to a second pole extending from a proximal second pole end that is connected to the pivot arm, to a distal second pole end that is connected to one or more items of electrical equipment.

In some exemplary embodiments of the controlled motion hinge assembly, the one or more items of electrical equipment comprises one or more items of wireless transmission equipment.

In some exemplary embodiments of the controlled motion hinge assembly, the hinge comprises a first hinge bracket mounted to the base, a second hinge bracket mounted to the pivot arm, and a pivot pin connecting the first hinge bracket to the second hinge bracket.

In some exemplary embodiments of the controlled motion hinge assembly, the first shaft end comprises a drive fitting.

In some exemplary embodiments of the controlled motion hinge assembly, the drive fitting is not enclosed when the hinge assembly is configured for use.

In some exemplary embodiments of the controlled motion hinge assembly, the drive fitting comprises an eye loop.

In some exemplary embodiments of the controlled motion hinge assembly, the assembly further includes a drive member comprising a hook configured to removably insert into the eye loop, and apply the drive torque to the eye loop when inserted in the eye loop.

In some exemplary embodiments of the controlled motion hinge assembly, the drive member comprises an elongated shaft having the hook at one end, and a crank arm at another end.

In some exemplary embodiments of the controlled motion hinge assembly, the assembly further includes a sheath surrounding the threaded body between the first actuator mount and the second actuator mount.

In some exemplary embodiments of the controlled motion hinge assembly, the sheath is flexible between a first configuration in which the sheath covers an entirety of the threaded body between the first actuator mount and the second actuator mount when the pivot arm is in the extended position, and a second configuration in which the sheath covers an entirety of the threaded body between the first actuator mount and the second actuator mount when the pivot arm is in the retracted position.

In some exemplary embodiments of the controlled motion hinge assembly, the sheath further encloses the second actuator mount.

In some exemplary embodiments of the controlled motion hinge assembly, the second shaft end is connected to the second actuator mount by one or more bushings or bearings.

In some exemplary embodiments of the controlled motion hinge assembly, the second shaft end is connected to the second actuator mount by a thrust bearing assembly configured to hold the second shaft end to the second actuator mount at a fixed location relative to the actuator shaft axis.

In another exemplary aspect, there is provided a pole assembly comprising: a first pole extending in a gravitational direction from a lower first pole end that is configured to be secured to an underlying surface, to an upper first pole end that is configured to be cantilevered above the underlying surface; a second pole extending from a proximal second pole end to a distal second pole end; and a controlled motion hinge assembly. The controlled motion hinge assembly has a base secured adjacent to the upper first pole end, a pivot arm secured to the proximal second pole end, a hinge pivotally connecting the base to the pivot arm such that the pivot arm is movable relative to the base about an arm pivot axis that is oriented perpendicular to the gravitational direction, wherein the pivot arm is movable between an extended position in which the second pole extends along the gravitational direction with the distal second pole end above the proximal second pole end, and a retracted position in which the second pole is oriented with the distal second pole end below the proximal second pole end, and an actuator configured to be manually operated, by an operator located on the underlying surface, to selectively move the pivot arm between the extended position and the retracted position. The distal second pole end is positioned to be serviced by the operator located on the underlying surface when the pivot arm is in the retracted position.

In some exemplary embodiments of the pole assembly, the pivot arm is angularly displaced by more than 90 degrees about the arm pivot axis between the extended position and the retracted position.

In some exemplary embodiments of the pole assembly, the pivot arm is angularly displaced by at least 110 degrees about the arm pivot axis between the extended position and the retracted position.

In some exemplary embodiments of the pole assembly, the pivot arm is angularly displaced by at least 135 degrees about the arm pivot axis between the extended position and the retracted position.

In some exemplary embodiments of the pole assembly, the controlled motion hinge assembly comprises a threaded body configured to engage the base and the pivot arm to move the pivot arm between the extended position and the retracted position, and having an exposed drive fitting located adjacent the base.

In some exemplary embodiments of the pole assembly, the pole assembly further includes a drive member having a first end removably connectable to the drive fitting, and a second end configured to receive a drive torque applied by the operator located on the underlying surface while the first end is connected to the drive fitting.

In some exemplary embodiments of the pole assembly, the second end of the drive member comprises a crank arm.

In some exemplary embodiments of the pole assembly, the controlled motion hinge assembly further comprises: a first actuator mount pivotally connected to the base to rotate about a first mount rotation axis that is parallel to the arm pivot axis, wherein the first actuator mount comprises a threaded bore extending along a bore axis that is perpendicular to the first mount rotation axis; and a second actuator mount pivotally connected to the pivot arm to rotate about a second mount rotation axis that is parallel to and spaced from the arm pivot axis, and parallel to the arm pivot axis; wherein the threaded body is positioned on an actuator shaft having a first shaft end, a second shaft end, and the threaded body extending along an actuator shaft axis between the first shaft end and the second shaft end. In addition, the first shaft end is configured to receive a drive torque about the actuator shaft axis, the second shaft end is connected to the second actuator mount to be rotatable about the actuator shaft axis at a fixed position along the actuator shaft axis, and the threaded body is in threaded engagement with the threaded bore of the first actuator mount such that an application of the drive torque causes the first actuator mount to move along the actuator shaft axis towards and away from the second actuator mount, to thereby move the pivot arm towards the retracted position and the extended position, respectively.

In some exemplary embodiments of the pole assembly, the second shaft end is connected to the second actuator mount by a thrust bearing assembly configured to hold the second shaft end to the second actuator mount at a fixed location relative to the actuator shaft axis.

In some exemplary embodiments of the pole assembly, the base and pivot arm are configured to be in contact at respective stop surfaces adjacent to the hinge when the pivot arm is in the extended position to thereby prevent rotation about the arm pivot axis beyond the extended position.

In some exemplary embodiments of the pole assembly, the base is configured to be secured to the first pole in a plurality of different orientations, with the arm pivot axis perpendicular to the gravitational direction in each of the plurality of different orientations.

In some exemplary embodiments of the pole assembly, the distal second pole end is configured to mount one or more electronic devices that are positioned to be serviced by the operator located on the underlying surface when the pivot arm is in the retracted position.

In some exemplary embodiments of the pole assembly, the lower first pole end is at least 3 meters from the upper first pole end.

In some exemplary embodiments of the pole assembly a first length from the underlying surface to the pivot arm axis is not more than two meters greater than a second length from the pivot arm axis to the distal second pole end.

In another exemplary aspect, there is provided a method for retrofitting a pole assembly comprising a first pole extending in a gravitational direction from a lower first pole end that is secured to an underlying surface, to an upper first pole end that is cantilevered above the underlying surface. The method includes providing a controlled motion hinge assembly comprising: a base, a pivot arm having a mounting structure, a hinge pivotally connecting the base to the pivot arm such that the pivot arm is movable relative to the base about an arm pivot axis that is oriented perpendicular to the gravitational direction, wherein the pivot arm is movable between an extended position in which the mounting structure is along the arm pivot axis relative to the gravitational direction, and a retracted position in which the mounting structure is below the arm pivot axis relative to the gravitational direction, and an actuator configured to be manually operated, by an operator located on the underlying surface, to selectively move the pivot arm between the extended position and the retracted position. The method also comprises securing the base to the upper first pole end, providing a second pole extending from a proximal second pole end to a distal second pole end, and securing the proximal second pole end to the pivot arm, such that the second pole is oriented along the gravitational direction above the first pole when the pivot arm is in the extended position, and the distal second pole end is located below the arm pivot axis when the pivot arm is in the retracted position.

In some exemplary embodiments of the method, the distal second pole end is positioned to be serviced by an operator located on the underlying surface when the pivot arm is in the retracted position.

In some exemplary embodiments of the method, the pivot arm is angularly displaced by more than 90 degrees about the arm pivot axis between the extended position and the retracted position.

In some exemplary embodiments of the method, the pivot arm is angularly displaced by at least 110 degrees about the arm pivot axis between the extended position and the retracted position.

In some exemplary embodiments of the method, the pivot arm is angularly displaced by at least 135 degrees about the arm pivot axis between the extended position and the retracted position.

In some exemplary embodiments of the method, the controlled motion hinge assembly comprises a threaded body configured to engage the base and the pivot arm to move the pivot arm between the extended position and the retracted position, and having an exposed drive fitting located adjacent the base.

In some exemplary embodiments of the method, the method includes manually operating the actuator from a position on the underlying surface adjacent the lower first pole end to move the pivot arm from the retracted position to the extended position.

In some exemplary embodiments of the method, the method includes installing one or more items of electrical equipment onto the distal second pole end prior to operating the actuator from the position on the underlying surface adjacent the lower first pole end to move the pivot arm from the retracted position to the extended position.

BRIEF DESCRIPTION OF THE DRAWINGS

The above and other aspects and features of the present invention will become more apparent to those of ordinary skill in the art by describing in detail exemplary embodiments thereof with reference to the attached drawings, in which like features are designated with like numbers.

FIG. 3 is an elevation view of the actuator system of FIG. 1

FIG. 4 is an exploded isometric view of the controlled motion hinge assembly of FIG. 1.

DETAILED DESCRIPTION OF THE INVENTION

Figure 1:
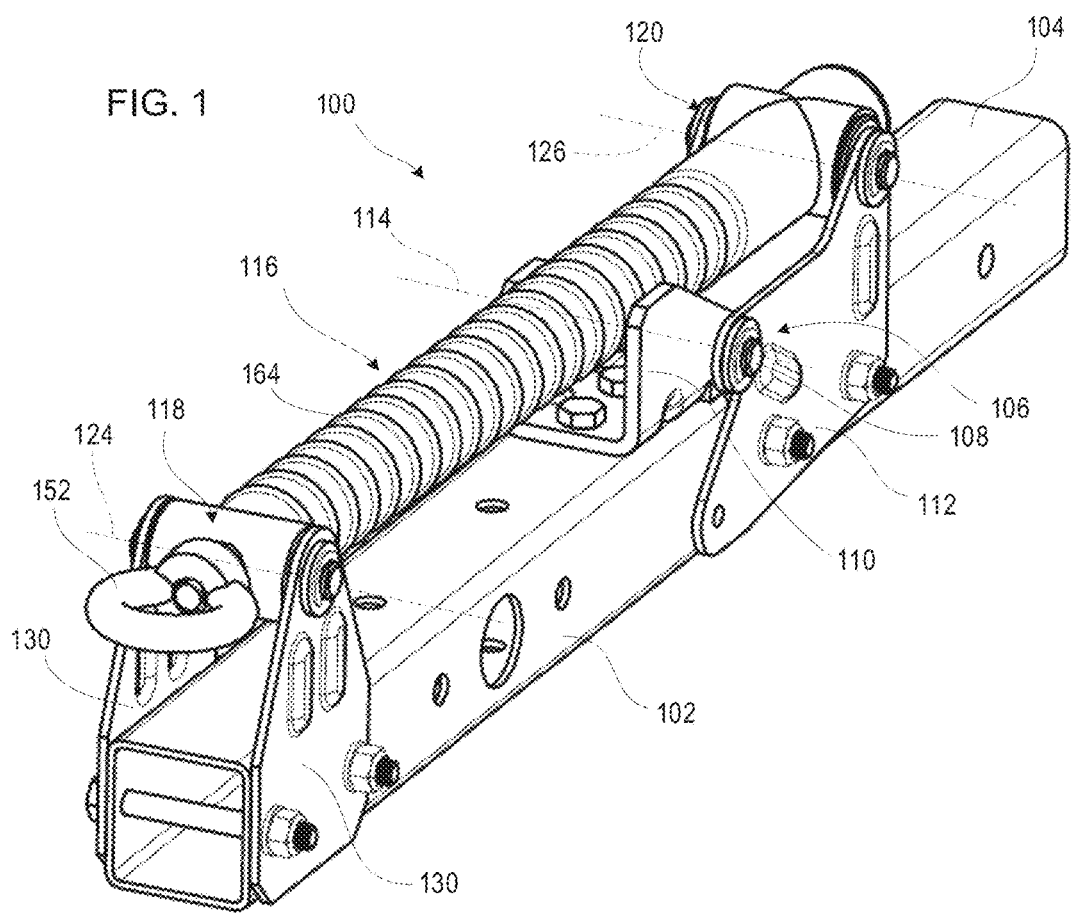
FIG. 1 is an isometric view of an exemplary embodiment of an controlled motion hinge assembly.

Although the invention is illustrated and described herein with reference to specific embodiments, the invention is not intended to be limited to the details shown. Rather, various modifications may be made in the details within the scope and range of equivalents of the claims and without departing from the invention. In the drawings, like item numbers refer to like elements.

Terms concerning attachments, coupling and the like, such as "mounted," "connected" and "interconnected," refer to a relationship wherein structures are secured or attached to one another either directly or indirectly through intervening structures, as well as both movable or rigid attachments or relationships, unless expressly described otherwise.

Referring now to the attached drawings, exemplary embodiments described and illustrated herein generally relate to a controlled motion hinge assembly 100 having a base 102 and a pivot arm 104 that is attached to the base 102 by a hinge 106. The base 102 and pivot arm 104 are shown in this example as being tubular pieces having a square sectional shape. For example, the base 102 and pivot arm 104 may be formed by 1 inch square welded steel box tube, extruded aluminum or the like. Such materials are readily available and offer simplicity in machining. Other embodiments may be formed using other materials, such as round-section tubular steel or aluminum, or parts having other sectional shapes such as L-shapes, H-shapes, and the like. The base 102 and pivot arm 104 also may be made from assemblies of component parts, composite materials, cast as single pieces (e.g., including other parts that are bolted on as described below) or the like.

The exemplary hinge 106 comprises a hinge pin 108 that is secured in a double shear configuration to a hinge leaf 110 that is secured to the base 102, and a pair of hinge plates 112 that are secured to the pivot arm 104. A single hinge pin 108 is shown, but two or more separate and axially spaced hinge pins may be used in other embodiments. The hinge pin 108 may be a solid pin, such as shown, or a tubular pin or rivet, as known in the art. The hinge 106 connects the base 102 to the pivot arm 104 such that the pivot arm 104 is movable relative to the base about an arm pivot axis 114 that is collinear with the hinge pin 108. The hinge pin 108 and arm pivot axis 114 may be offset from the base 102 and pivot arm 104, such as shown, to facilitate a greater range of motion.

The hinge assembly 100 also includes an actuator system 116 configured to control the rotation of the pivot arm 104 relative to the base 102. In the shown example, the actuator system 116 includes a first actuator mount 118 affixed to the base 102, a second actuator mount 120 affixed to the pivot arm 104, and an actuator shaft 122 (see FIGS. 2 and 4) operatively connected to the first actuator mount 116 and the second actuator mount 118.

Figure 2:
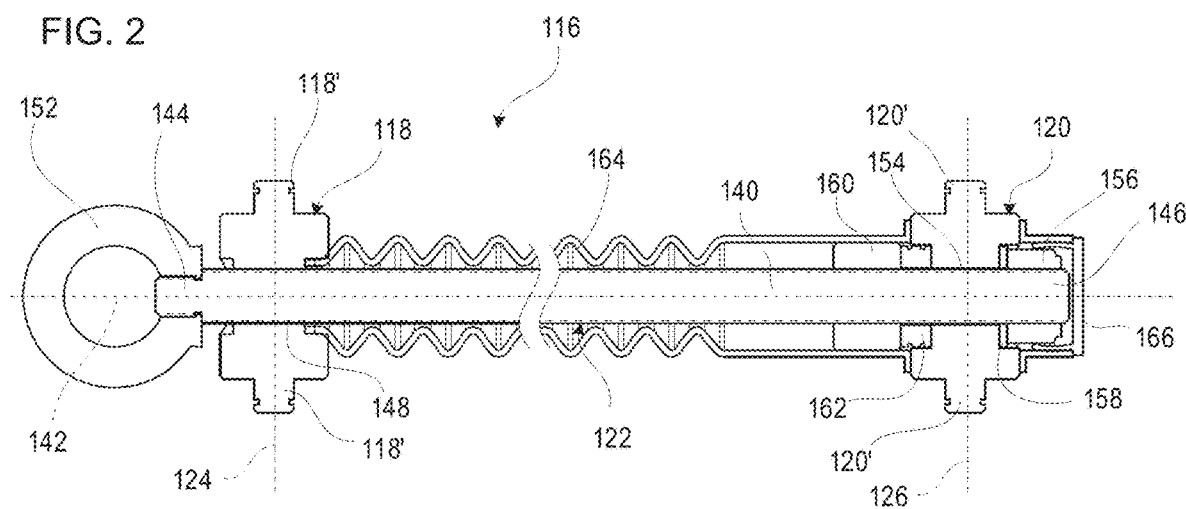
FIG. 2 is a top plan view of the actuator system of the embodiment of FIG. 1, shown along line II-II of FIG. 3.

As best shown in FIGS. 2 and 4, the first actuator mount 118 is rotatably connected to the base 102 to rotate about a first mount rotation axis 124, and the second actuator mount is rotatably connected to the pivot arm 104 to rotate about a second mount rotation axis 126. For example, the first actuator mount 118 comprises a pair of collinear mounting pins 118' that extend along the first mount rotation axis 124, and rotatably fit into a corresponding pair of collinear first mounting holes 128 provided on the base 102. The first mounting holes 128 may be integrally formed with the base 102, or they may be formed separately and attached to the base 102. In this example, the first mounting holes 128 are provided in respective first mounting plates 130, which are secured to the base 102 to hold the first mounting holes 128 rigidly in place relative to the base 102. Similarly, the second actuator mount 120 comprises a pair of collinear mounting pins 120' that extend along the second mount rotation axis 126, and rotatably fit into a corresponding pair of collinear second mounting holes 132 provided on the pivot arm 104. The second mounting holes 132 are secured to the pivot arm 104 by being formed in the hinge plates 112, but alternatively may be provided in respective second mounting plates that are separate from the hinge plates 112. In this example, the first mounting plates 130 and the hinge plates 112 are secured to the base 102 and pivot arm 104, respectively, by bolts, washers and nuts, but other securement mechanisms may be used in other cases.

In the shown example, the first actuator mount 118, second actuator mount 120 and hinge pin 108 are all secured at each end by respective spring clips 136 that fit into corresponding annular grooves 138 on each pin 108, 118', 120'. This provides a relatively simple and durable construction, while allowing periodic service or repair.

The first mount rotation axis 124, second mount rotation axis 126, and arm pivot axis 114 are parallel and spaced apart from each other (i.e., parallel but not collinear). Thus, rotation of the pivot arm 104 relative to the base 102 causes the distance between the first mount rotation axis 124 and the second mount rotation axis 126 to vary as a function of angular rotation, with such behavior being according to the familiar trigonometric functions. The actuator system 116 is configured to control this movement by rotating the actuator shaft 122.

The exemplary actuator shaft 122 has a threaded body 140 that extends along an actuator shaft axis 142 between a first shaft end 144 and a second shaft end 146. The threaded body 140 is threaded into a corresponding threaded bore 148 that extends through the first actuator mount 118 along a bore axis 150 that is perpendicular to the first mount rotation axis 124. When the threaded body 140 is installed in the threaded bore 148, the actuator shaft axis 142 and bore axis 150 are collinear. Rotation of the threaded body 140 relative to the first actuator mount 118 causes the first actuator mount 118 and threaded body 140 to displace relative to each other along the collinear actuator shaft axis 142 and bore axis 150. The threaded body 140 and threaded bore 148 may have any suitable configuration of external threads and internal threads, respectively. Such threads preferably are selected to have a self-locking pitch angle, to prevent the weight of the pivot arm 104 and attached equipment from back-driving the threaded body 140. The threads may have any suitable form, such as a square, triangular or trapezoidal form (e.g., the so-called Acme thread form or the trapezoidal metric thread form).

The first shaft end 144 is used to rotate the actuator shaft 122. To this end, the first shaft end protrudes from the threaded bore 148 of the first actuator mount 118 where it is configured to receive a drive torque about the actuator shaft axis 142. The first shaft end 144 may have any suitable shape to receive such drive torque. In this example, the first shaft end 144 comprises a drive fitting 152 in the shape of an eye loop. As discussed below, this eye loop type of drive fitting 152 can be engaged by a hook or crossbar to transfer a drive torque to the actuator shaft 122. The drive fitting 152 may be attached to the first shaft end 144 using any suitable attachment system, such as corresponding mating threads, friction fit, weldment, a cotter pin, a keyed shaft connection, and so on. The first shaft end 144 also may have an integrally formed drive fitting 152. For example, the first shaft end 144 may be formed with a square or hexagonal outer profile to be received in a corresponding drive socket, or it may have an internal socket to receive an inserted tool.

In some cases, the hinge assembly 100 may be provided with the first shaft end 144 configured to receive a drive fitting 152, but without the drive fitting 152 itself. For example, the hinge assembly 100 may be provided to an end user or retailer that connects their own desired drive fitting 152 to the first shaft end 144. In other cases, the first shaft end 144 may simply comprise a continuation of the threaded body 140. In still other cases, the first shaft end 144 may comprise a bare cylindrical shape that can be welded to or machined to fit a particular drive fitting 152. As yet another example, the first shaft end 144 may comprise a tapered conical shape, such as a Morse taper, to friction fit into a drive fitting 152. It will be understood that, in any of these examples, the first shaft end 144 is configured to receive a drive torque by virtue of extending out from the first actuator mount 118 to be connected to some kind of drive fitting. Other alternatives and variations will be apparent to persons of ordinary skill in the art in view of the present disclosure.

The second shaft end 146 is connected to the second actuator mount 120 to be rotatable about the actuator shaft axis 142, but it is axially fixed to the second actuator mount 120 to remain at a fixed position relative thereto along the actuator shaft axis 142. For example, in the shown embodiment, the second shaft end 146 extends through a bore 154 through the second actuator mount 120, and is secured on each side of the bore 154 against axial movement. In this case, the second shaft end 146 is secured against axial movement towards the first shaft end 142 by a nut 156 and washer 158, and is secured against axial movement towards the second shaft end 146 by a bushing 160 and thrust bearing 162. The nut 156 is threaded onto the end of the second shaft end 146, which may comprise a continuation of the threaded body 140, and the washer 158 facilitates rotation of the actuator shaft 122 relative to the second actuator mount 120. The bushing 160 is axially and rotationally fixed to the second shaft end 146 by bonding (adhesive, epoxy, etc.), a friction fit, a pin, a machined shoulder, one or more nuts, or the like, and the thrust bearing 162 is positioned between the bushing 160 and the second actuator mount 120 to allow low-friction relative rotation between the actuator shaft 122 and the second actuator mount 120. In this case, the weight of the pivot arm 104 and connected equipment bears primarily on the interface between the second actuator mount 120 and the bushing 160, and therefore a thrust bearing 162 is desirable to reduce operating friction while lowering and raising the pivot arm 104. In other cases, different types of friction-reducing elements may be used (e.g., a greased metal-to-metal interface, lubricated bushings, etc.).

The actuator system 116 also may include various features to enhance serviceability and service life. For example, one or more grease fittings (not shown) may be provided at locations where parts are in frictional contact. As another example, the actuator system 116 may include a gaiter or sheath 164 that surrounds the portion of the threaded body 140 located between the first actuator mount 118 and the second actuator mount 120. Such a sheath 164 may comprise an accordion-like body to allow expansion and contraction to fully cover this portion of the threaded body 140 throughout the range of motion. The sheath 164 also may wrap around the second actuator mount 120, and include a cap 166 to fully enclose the second shaft end 146.

Figure 5C:
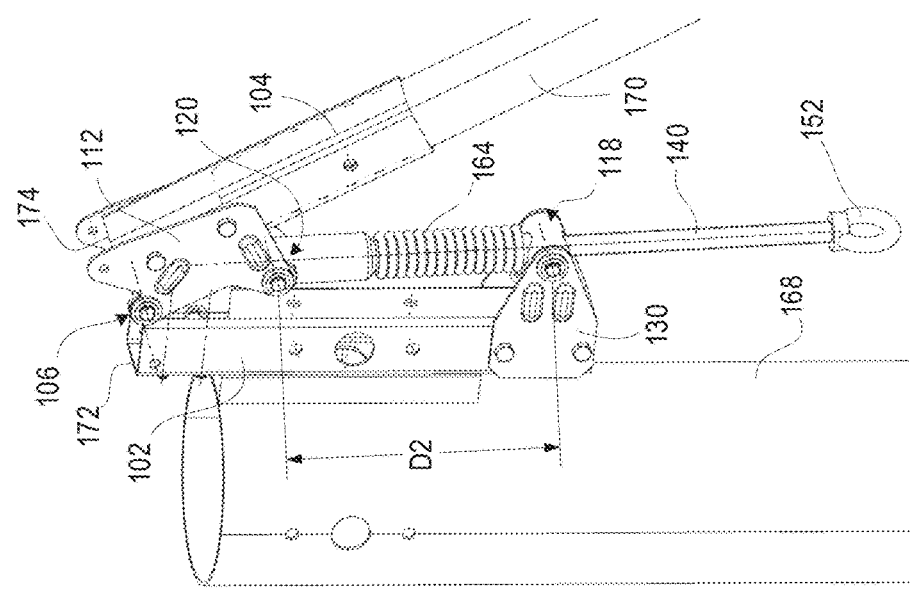
FIGS. 5A-5C are isometric views of an embodiment of a controlled motion hinge assembly installation, shown in the extended position (FIG. 5A), retracted position (FIG. 5C) and an intermediate position (FIG. 5B).
Figure 5B:
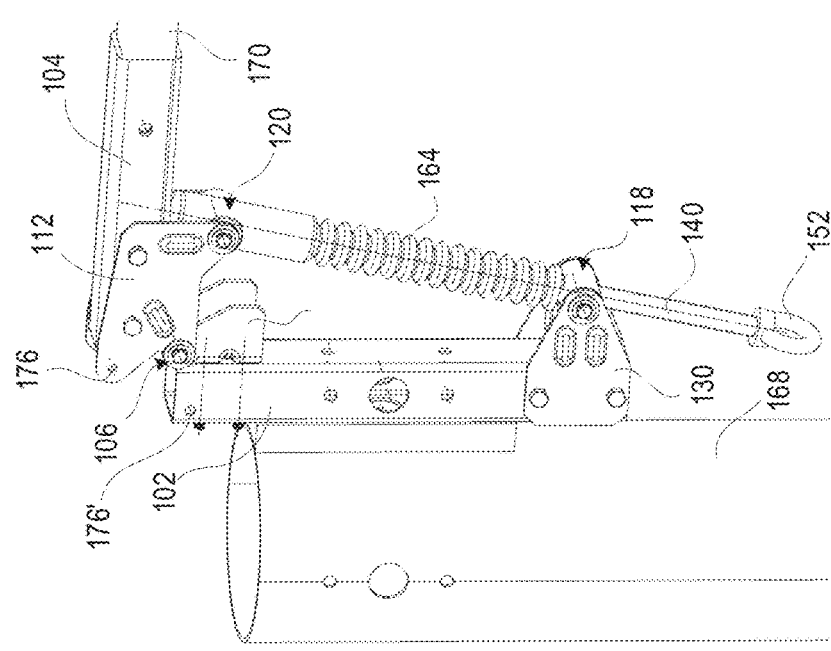
Figure 5A:
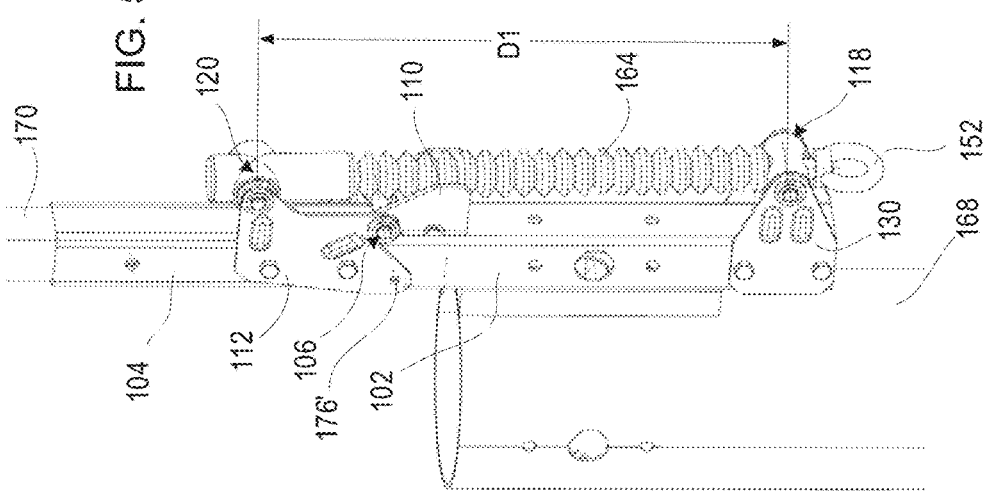

The installation of the hinge assembly 100 and its operation are illustrated in FIGS. 5A-5C. FIG. 5A shows the hinge assembly 100 with the base 102 attached to a first pole 168 and the pivot arm 104 attached to a second pole 170. It will be appreciated that the first pole 168 may be replaced by any adjacent structure that is capable of supporting the assembled parts, such as a building, rafter, or the like. In addition, the second pole 170 may be replaced by other structures, such as a sign or the like.

FIG. 5A shows the hinge assembly 100 in the extended position, and FIG. 5C shows the hinge assembly 100 in the retracted position. FIG. 5B is a horizontal position between the extended position and the retracted position. In the extended position, the first mount rotation axis 124 is spaced from the second mount rotation axis 126 by a first distance D1, and in the retracted position the first mount rotation axis 124 is spaced from the second mount rotation axis 126 by a second distance D2, with the second distance D2 being less than the first distance D1.

The actuator system 116 operates by applying a torque to the drive fitting 152, to thereby rotate the actuator shaft 122 about the actuator shaft axis 142 and change the distance between the first mount rotation axis 124 and the second mount rotation axis 126. For example, where the threads of the threaded body 140 and threaded bore 148 are right-hand threads, rotating the actuator shaft 122 clockwise, as viewed from the first shaft end 144 to the second shaft end 146, causes the first actuator mount 118 to move along the actuator shaft 122 towards the first shaft end 144, while the second actuator mount 120 remains fixed, relative to the actuator shaft axis 142, at the second shaft end 146. This movement causes the first mount rotation axis 124 to move away from the second mount rotation axis 126 and towards the extended position as shown in FIG. 5A. Conversely, rotating the actuator shaft 122 counterclockwise causes the first actuator mount 118 to move along the actuator shaft 122 towards the second shaft end 126, which causes the first mount rotation axis 124 to move towards the second mount rotation axis 126, and towards the retracted position as shown in FIG. 5C.

The positions of the first actuator mount 118, the second actuator mount 120, and the hinge 106 affect the overall range of movement of the pivot arm 104 relative to the base 102, as will be understood by applying the familiar trigonometric principles. It will be appreciated that the hinge assembly 100 can be configured to provide a large range of rotational motion between the pivot arm 104 and the base 102. For example, the actuator system 116, base 102, pivot arm 104, and hinge 106 can be configured such that the pivot arm 104 is angularly displaced by more than 90 degrees about the arm pivot axis 114 between the fully-extended position and the fully-retracted position. Even greater displacements are also possible. For example, the pivot arm 104 can be configured to rotate at least 110 degrees, or at least 135 degrees or more about the arm pivot axis 114 relative to the base 102. The advantages of such a large range of motion are discussed below.

It is also preferred, but not necessarily required, that the first actuator mount 118 and second actuator mount 120 are positioned such that a straight line between the first mount rotation axis 124 and the second mount rotation axis 126 does not intersect the arm pivot axis 114 at any point during the range of travel. This prevents the parts from assuming an "over-center" position in which a force applied to move the second actuator mount 120 towards the first actuator mount 118 causes the parts to contact each other at locations that prevent relative rotation. Such over-center motion can be prevented by providing a travel stop that prevents the parts from assuming the over-center position. For example, the base 102 and pivot arm 104 may comprise respective stop surfaces 172, 174 that are located adjacent to the hinge 106 and positioned to contact each other when the pivot arm 104 is in the extended position to prevent further rotation beyond the extended position.

If desired, the hinge assembly 100 also may include one or more locks or lock features that may be used to hold the pivot arm 104 in the extended position or in any other position relative to the base 102. For example, the hinge plates 112 may include holes 176 that correspond to holes 176' through the base 102, to allow a locking pin to be passed therethrough when the parts are in the extended position.

Figure 6:
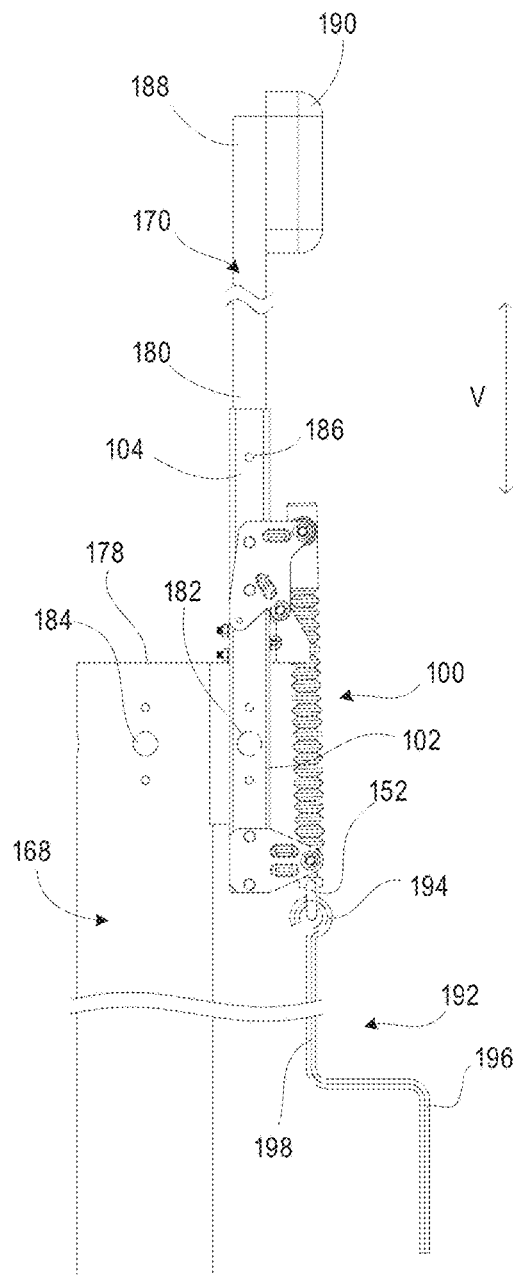
FIG. 6 is a side elevation view of another controlled motion hinge assembly installation, shown in the extended position with an exemplary drive member attached thereto.
Figure 7:
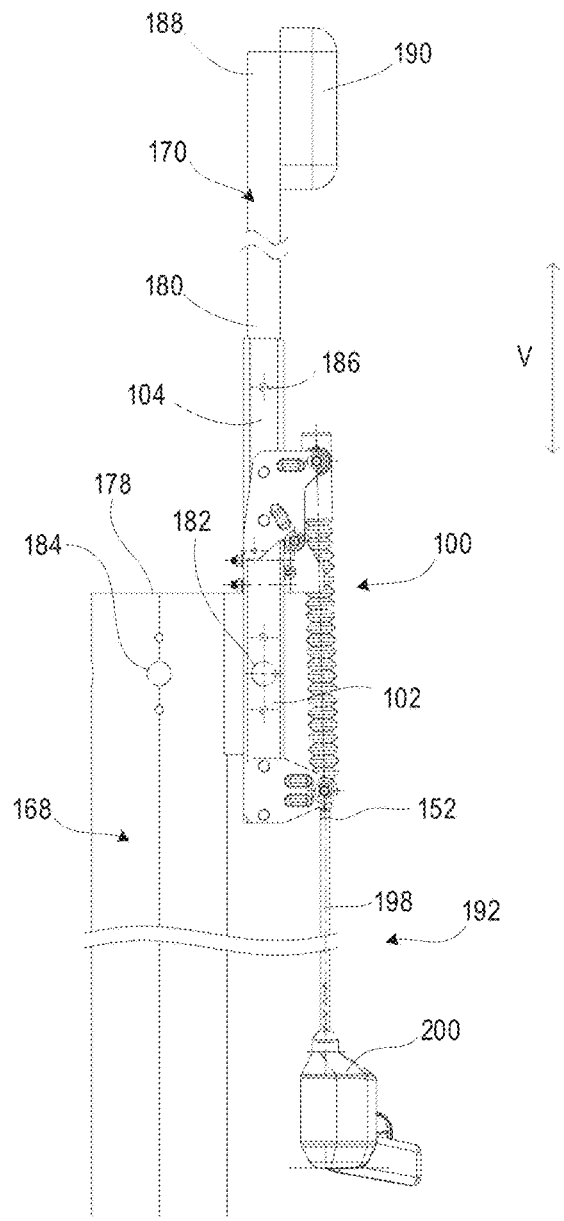
FIG. 7 is a side elevation view of another controlled motion hinge assembly installation, shown in the extended position with another exemplary drive member attached thereto.

FIGS. 6 and 7 provide more examples of a hinge assembly 100 and related features. In each case, the base 102 is mounted adjacent the upper first pole end 178 of a first pole 168, and the pivot arm 104 is connected adjacent to a proximal end 180 of a second pole 170. The first pole 168 extends in the gravitational direction V (i.e., vertically in a global sense). The second pole 170 is connected to the pivot arm 104 such that the second pole 170 is parallel to the first pole 128 when the hinge assembly 100 is in the extended position, as shown in FIGS. 6 and 7.

Any suitable connection may be used to mount the base 102 to the first pole 168. In the shown example, the base 102 has one or more sets of pre-formed fastener locations 182 that provide fixation points to connect to corresponding fastener locations 184 one the first pole 168. In this case, the base 102 has three sets of bolt holes, with one set on each side of the box-section body of the base 102, except for the side facing the actuator system 116 (also see FIGS. 1 and 4). The first pole 168 also may have multiple preformed fastener locations 184, such as the shown bolt holes. This provides the option to mount the base 102 at different orientations relative to the first pole 168. In each orientation, the hinge assembly 100 may be oriented such that the arm pivot axis 114, first mount rotation axis 124, and the second mount rotation axis 126 are perpendicular to the gravitational direction V.

Similarly, the second pole 170 may be secured to the pivot arm 104 using any suitable connection mechanism. In this case, the pivot arm 104 comprises a hollow box section into which the proximal second pole end 180 is fitted and secured by a pin 186, rivet, screw or the like.

The second pole 170 extends from the proximal second pole end 180 to a distal second pole end 188, and may have any desirable length provided it and the attached load can be properly supported by the hinge assembly 100 and first pole 168. In some cases, the second pole 170 may hold devices such one or more items of electrical equipment 190. Such items may include a security camera, a light, or an electronic beacon. In some cases, the electrical equipment 190 may include wireless transmission equipment, such as repeaters, communication nodes, antennae (e.g. 5G telecommunications antennae), satellite receivers or transceivers, and so on.

As shown in FIGS. 6 and 7, the drive fitting 152 is not covered (i.e., it is exposed to external contact) when the hinge assembly 100 is configured for use. This allows easy access to the drive fitting 152 under all circumstances, and is particularly helpful when the drive fitting 152 is not within hand reach of an operator standing on the ground supporting the first pole 168. FIGS. 6 and 7 show two different alternatives for operating the drive fitting 152. In FIG. 6, the drive fitting 152 comprises an eye loop, which is operated by a drive member 192 having a hook 194 connected to a crank arm 196 by an elongated shaft 198. The drive member 192 preferably is removable from the drive fitting 152, such as by removing the hook 194 from the eye loop. This allows a service technician to reach a great distance beyond his or her arms' reach to operate the drive fitting 152, and prevents access to the drive fitting 152 when the drive member 192 is removed. In other embodiments, the drive member 192 may be permanently affixed to the drive fitting 152, and, if access by unauthorized persons is a risk, secured by a lock to the lower pole 168 or another structure to prevent tampering. Similarly, FIG. 7 shows a drive member 192 in the form of an elongated shaft 198 that is driven by an electric drill motor 200. FIG. 7 also shows an alternative drive fitting 152, in the configuration of a socket-type connection as described above.

Figure 8:
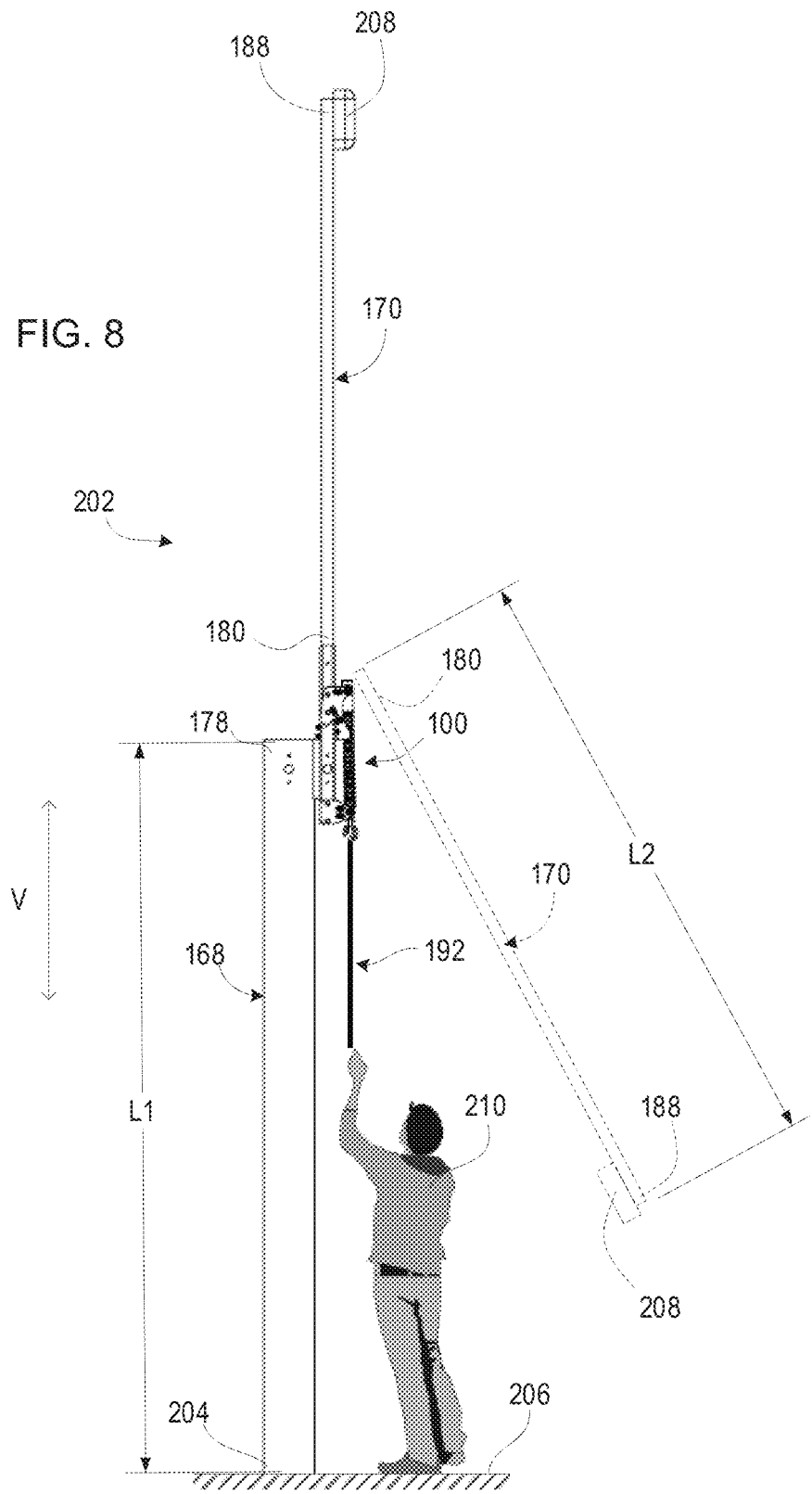
FIG. 8 illustrates a pole assembly having a controlled motion hinge assembly, shown in the extended and retracted positions.

FIG. 8 shows a complete pole assembly 202 having a first pole 168, a second pole 170, and a hinge assembly 100, such as those described herein, joining the first pole 168 to the second pole 170. The first pole 168 extends in the gravitational direction V from a lower first pole end 204 to an upper first pole end 178. The lower first pole end 204 is configured to be secured to an underlying surface 206, such as the ground or a building structure, via conventional attachment mechanisms (e.g., embedding in concrete, break-away bolts, etc.), such that the upper first pole end 178 is cantilevered above the underlying surface 206. The second pole 170 extends parallel to the first pole 168 when the hinge assembly 100 is in the extended position.

In normal use, the proximal second pole end 180 is located below the distal second pole end 188, and one or more items of equipment 208, such as electrical equipment or the like, are secured to the second pole 170 at an elevated position above the first pole 168. FIG. 8 shows the equipment 208 being at the distal second pole end 188, but the equipment 208 may be located at any desired position along the second pole 170.

Installation and service of the equipment 208 may be performed by operating the hinge assembly 100 to the retracted position, as shown in dashed lines. In this position, the second pole is oriented with the distal second pole end 188 below the proximal second pole end 180. As shown in FIG. 8, the hinge assembly 100 may be located well above the arm reach of the operator 210. However, the operator 210 can operate the actuator system 116 of the hinge assembly 100 to move the second pole 170 between the extended and retracted positions, by using a drive member 192, such as those described herein or having any other suitable construction.

In a preferred embodiment, when the second pole 170 is in the retracted position, the distal second pole end 188 is located within the arm reach of the operator 210, to allow the operator 210 to perform service without leaving the underlying surface 206. To this end, the second pole 170 may have a length that is equal to or even greater than the first pole 168. For example, if the hinge assembly 100 is configured to place the second pole 170 at 180 degrees relative to the first pole 168 when it is in the retracted position, the second pole 170 can be as long as the first pole 168 minus about two meters. This would place the distal second pole end 188 at about two meters from the underlying surface 206 when the second pole 170 is fully retracted. Thus, for service at the level of the underlying surface 206, the a first length L1 from the underlying surface 206 to the pivot arm axis 114 is not more than two meters greater than a second length L2 from the pivot arm axis 114 to the distal second pole end 188 or the equipment 208 to be serviced.

It will be apparent from the foregoing that this type of hinge assembly 100 installation can provide significant benefits over conventional pole mounting systems. For example, the hinge assembly 100 can be mounted at a high location (e.g., greater than 3 meters from the underlying surface 206) while still being readily operable for service using a simple and inexpensive drive member 192. This high position allows the hinge assembly 100 and its actuator system 116 to remain out of contact with unauthorized persons, and reduces the weight that must be handled by the hinge assembly 100 by allowing the use of a relatively small second pole 170 as compared to base-hinged columns. This type of installation also allows the second pole 170 to be tailored to the requirements of the equipment. For example, if the equipment is relatively light (e.g., a single 5G antenna or repeater), the second pole 170 can be made of lightweight materials that allow the second pole 170 to be longer, or allow the hinge assembly 100 to be made less robust to handle the load.

Still further, the hinge assembly 100 may be used to position the equipment for service at or near the location at which the lower pole 168 is connected to the underlying surface 206. This is in contrast to base-hinged columns, in which the upper part of the column lies essentially horizontal to the ground during service, which requires the operator 210 to traverse the entire length of the upper part of the column to reach equipment at the top of the column. This arrangement is therefore more convenient, and it also allows the pole assembly 202 can be used on small raised platforms or adjacent to overhangs or areas where it is not safe or possible to lay a pole adjacent the ground for service, such as next to a roadway or in confined spaces.

In cases in which the drive member 192 is removable, the upper limit of the hinge assembly 100 placement is limited only by the operator's ability to manipulate the drive member 192 into place. However, the drive member 192 may have multiple segments, with only the lower-most segment being removable. Thus, an operator could use a short removable lower segment of the drive member 192 (e.g., one or two meters long) to engage a permanently fixed upper segment that remains connected to the lower pole 168 and the first shaft end 144.

It will also be appreciated that embodiments may be used to retrofit existing pole assemblies to include a second pole. For example, a controlled motion hinge assembly 100 such as described herein can be attached to an existing light pole, telecommunications pole, building, sign, water tower, or the like, and equipped with a second pole 170 that extends above the existing structure when the hinge assembly 100 is moved to the extended position. Once the hinge assembly 100 and second pole 170 are installed, an operator can lower the second pole 170 to the retracted position, install the desired equipment, and move the second pole 170 to the extended position.

It is also noted that the base 102 and pivot arm 104 may conveniently be used to hold and/or route electrical wiring or cables leading to the equipment. For example, in embodiments in which the base 102 and pivot arm 104 are formed by hollow tubes (e.g., box-section), wiring can be passed through the hollow tubes. In other cases, wiring harness connectors or the like may be attached externally to the base 102 and pivot arm 104.

While the foregoing advantages are expected to be realized with one or more embodiments, the invention is not limited to providing any particular advantage or collection of advantages. Furthermore, it is expected that other advantages and uses will become apparent with practice of the invention provided herein.

Various embodiments of the invention have been shown and described herein, but it will be understood that such embodiments are provided by way of example only. Numerous variations, changes and substitutions will occur to those skilled in the art without departing from the spirit of the invention. For instance, the parts described herein may be constructed or assembled in any way. For example, bolted connections may be replaced by rivets, pins, bonding (e.g., epoxy or adhesives), or welded connections, and multi-part assemblies may be replaced by unitary castings or machined parts. As another example, parts that are secured with spring clips may instead be secured by welding, threaded nuts, or integrally formed flanges or the like. Other alternatives and variations will be apparent to persons of ordinary skill in the art in view of the present disclosure. Accordingly, it is intended that the appended claims cover all such variations as fall within the spirit and scope of the invention.

What is claimed:

1. A controlled motion hinge assembly comprising:
    a base;
    a first actuator mount rotatably connected to the base to rotate about a first mount rotation axis, wherein the first actuator mount comprises a threaded bore extending along a bore axis that is perpendicular to the first mount rotation axis;
    a pivot arm pivotally coupled to the base to pivot about an arm pivot axis that is parallel to and spaced from the first mount rotation axis;
    a second actuator mount rotatably connected to the pivot arm to rotate about a second mount rotation axis that is parallel to and spaced from the first mount rotation axis and the arm pivot axis;
    a hinge pivotally connecting the base to the pivot arm such that the pivot arm is movable relative to the base about the arm pivot axis, wherein the pivot arm is movable between an extended position in which the first mount rotation axis is spaced from the second mount rotation axis by a first distance, and a retracted position in which the first mount rotation axis is spaced from the second mount rotation axis by a second distance, the second distance being less than the first distance; and
    an actuator shaft having a first shaft end, a second shaft end, and a threaded body extending along an actuator shaft axis between the first shaft end and the second shaft end, wherein:
    the first shaft end is configured to receive a drive torque about the actuator shaft axis;
    the second shaft end is connected to the second actuator mount to be rotatable about the actuator shaft axis at a fixed position along the actuator shaft axis; and
    the threaded body is in threaded engagement with the threaded bore of the first actuator mount such that an application of the drive torque causes the first actuator mount to move along the actuator shaft axis towards and away from the second actuator mount, to thereby move the pivot arm towards the retracted position and the extended position, respectively; and
    wherein the pivot arm is angularly displaced by more than 90 degrees about the arm pivot axis between the extended position and the retracted position.

2. The controlled motion hinge assembly of claim 1, wherein the pivot arm is angularly displaced by at least 110 degrees about the arm pivot axis between the extended position and the retracted position.

3. The controlled motion hinge assembly of claim 1, wherein the pivot arm is angularly displaced by at least 135 degrees about the arm pivot axis between the extended position and the retracted position.

4. The controlled motion hinge assembly of claim 1, wherein the base and pivot arm are configured to be in contact at respective stop surfaces adjacent to the hinge when the pivot arm is in the extended position to thereby prevent rotation about the arm pivot axis beyond the extended position.

5. The controlled motion hinge assembly of claim 1, wherein the base is configured to be secured to a first pole, and the pivot arm is configured to be secured to a proximal second pole such that the proximal second pole is parallel to the first pole when the pivot arm is in the extended position.

6. The controlled motion hinge assembly of claim 5, further comprising a second pole extending from the proximal second pole end that is connected to the pivot arm, to a distal second pole end, and wherein the distal second pole end is configured to be connected to one or more items of electrical equipment.

7. The controlled motion hinge assembly of claim 1, wherein the first shaft end comprises a drive fitting.

8. The controlled motion hinge assembly of claim 1, wherein the second shaft end is connected to the second actuator mount by one or more bushings or bearings.

9. The controlled motion hinge assembly of claim 8, wherein the second shaft end is connected to the second actuator mount by a thrust bearing assembly configured to hold the second shaft end to the second actuator mount at a fixed location relative to the actuator shaft axis.

10. A controlled motion hinge assembly comprising:
a base;
a first actuator mount rotatably connected to the base to rotate about a first mount rotation axis, wherein the first actuator mount comprises a threaded bore extending along a bore axis that is perpendicular to the first mount rotation axis;
a pivot arm pivotally coupled to the base to pivot about an arm pivot axis that is parallel to and spaced from the first mount rotation axis;
a second actuator mount rotatably connected to the pivot arm to rotate about a second mount rotation axis that is parallel to and spaced from the first mount rotation axis and the arm pivot axis;
a hinge pivotally connecting the base to the pivot arm such that the pivot arm is movable relative to the base about the arm pivot axis, wherein the pivot arm is movable between an extended position in which the first mount rotation axis is spaced from the second mount rotation axis by a first distance, and a retracted position in which the first mount rotation axis is spaced from the second mount rotation axis by a second distance, the second distance being less than the first distance; and
an actuator shaft having a first shaft end, a second shaft end, and a threaded body extending along an actuator shaft axis between the first shaft end and the second shaft end, wherein:
the first shaft end is configured to receive a drive torque about the actuator shaft axis;
the second shaft end is connected to the second actuator mount to be rotatable about the actuator shaft axis at a fixed position along the actuator shaft axis; and
the threaded body is in threaded engagement with the threaded bore of the first actuator mount such that an application of the drive torque causes the first actuator mount to move along the actuator shaft axis towards and away from the second actuator mount, to thereby move the pivot arm towards the retracted position and the extended position, respectively; and
wherein the hinge comprises a first hinge bracket mounted to the base, a second hinge bracket mounted to the pivot arm, and a pivot pin connecting the first hinge bracket to the second hinge bracket.

11. A controlled motion hinge assembly comprising:
a base;
a first actuator mount rotatably connected to the base to rotate about a first mount rotation axis, wherein the first actuator mount comprises a threaded bore extending along a bore axis that is perpendicular to the first mount rotation axis;
a pivot arm pivotally coupled to the base to pivot about an arm pivot axis that is parallel to and spaced from the first mount rotation axis;
a second actuator mount rotatably connected to the pivot arm to rotate about a second mount rotation axis that is parallel to and spaced from the first mount rotation axis and the arm pivot axis;
a hinge pivotally connecting the base to the pivot arm such that the pivot arm is movable relative to the base about the arm pivot axis, wherein the pivot arm is movable between an extended position in which the first mount rotation axis is spaced from the second mount rotation axis by a first distance, and a retracted position in which the first mount rotation axis is spaced from the second mount rotation axis by a second distance, the second distance being less than the first distance; and
an actuator shaft having a first shaft end, a second shaft end, and a threaded body extending along an actuator shaft axis between the first shaft end and the second shaft end, wherein:
the first shaft end is configured to receive a drive torque about the actuator shaft axis;
the second shaft end is connected to the second actuator mount to be rotatable about the actuator shaft axis at a fixed position along the actuator shaft axis; and
the threaded body is in threaded engagement with the threaded bore of the first actuator mount such that an application of the drive torque causes the first actuator mount to move along the actuator shaft axis towards and away from the second actuator mount, to thereby move the pivot arm towards the retracted position and the extended position, respectively; and
a sheath surrounding the threaded body between the first actuator mount and the second actuator mount.

12. The controlled motion hinge assembly of claim 11, wherein the sheath is flexible between a first configuration in which the sheath covers an entirety of the threaded body between the first actuator mount and the second actuator mount when the pivot arm is in the extended position, and a second configuration in which the sheath covers an entirety of the threaded body between the first actuator mount and the second actuator mount when the pivot arm is in the retracted position.

13. The controlled motion hinge assembly of claim 12, wherein the sheath further encloses the second actuator mount.

14. A pole assembly comprising:
a first pole extending in a gravitational direction from a lower first pole end that is configured to be secured to an underlying surface, to an upper first pole end that is configured to be cantilevered above the underlying surface;
a second pole extending from a proximal second pole end to a distal second pole end; and
a controlled motion hinge assembly comprising:
a base secured adjacent to the upper first pole end,
a pivot arm secured to the proximal second pole end,
a hinge pivotally connecting the base to the pivot arm such that the pivot arm is movable relative to the base about an arm pivot axis that is oriented perpendicular to the gravitational direction, wherein the pivot arm is movable between an extended position in which the second pole extends along the gravitational direction with the distal second pole end above the proximal second pole end, and a retracted position in which the second pole is oriented with the distal second pole end below the proximal second pole end, and
an actuator configured to be manually operated, by an operator located on the underlying surface, to selectively move the pivot arm between the extended position and the retracted position;
wherein the distal second pole end is positioned to be serviced by the operator located on the underlying surface when the pivot arm is in the retracted position.

15. The pole assembly of claim 14, wherein the pivot arm is angularly displaced by more than 90 degrees about the arm pivot axis between the extended position and the retracted position.

16. The pole assembly of claim 14, wherein the pivot arm is angularly displaced by at least 110 degrees about the arm pivot axis between the extended position and the retracted position.

17. The pole assembly of claim 14, wherein the pivot arm is angularly displaced by at least 135 degrees about the arm pivot axis between the extended position and the retracted position.

18. The pole assembly of claim 14, wherein the controlled motion hinge assembly further comprises:
a threaded body configured to engage the base and the pivot arm to move the pivot arm between the extended position and the retracted position, and having an exposed drive fitting located adjacent the base;
a first actuator mount pivotally connected to the base to rotate about a first mount rotation axis that is parallel to the arm pivot axis, wherein the first actuator mount comprises a threaded bore extending along a bore axis that is perpendicular to the first mount rotation axis; and
a second actuator mount pivotally connected to the pivot arm to rotate about a second mount rotation axis that is parallel to and spaced from the arm pivot axis, and parallel to the arm pivot axis;
wherein the threaded body is positioned on an actuator shaft having a first shaft end, a second shaft end, and the threaded body extending along an actuator shaft axis between the first shaft end and the second shaft end; and
wherein:
the first shaft end is configured to receive a drive torque about the actuator shaft axis,
the second shaft end is connected to the second actuator mount to be rotatable about the actuator shaft axis at a fixed position along the actuator shaft axis, and
the threaded body is in threaded engagement with the threaded bore of the first actuator mount such that an application of the drive torque causes the first actuator mount to move along the actuator shaft axis towards and away from the second actuator mount, to thereby move the pivot arm towards the retracted position and the extended position, respectively.

19. The pole assembly of claim 14, wherein the lower first pole end is at least 3 meters from the upper first pole end.

20. The pole assembly of claim 14, wherein a first length from the underlying surface to the pivot arm axis is not more than two meters greater than a second length from the pivot arm axis to the distal second pole end.

21. A method for retrofitting a pole assembly comprising a first pole extending in a gravitational direction from a lower first pole end that is secured to an underlying surface, to an upper first pole end that is cantilevered above the underlying surface, the method comprising:
providing a controlled motion hinge assembly comprising:
a base,
a pivot arm having a mounting structure,
a hinge pivotally connecting the base to the pivot arm such that the pivot arm is movable relative to the base about an arm pivot axis that is oriented perpendicular to the gravitational direction, wherein the pivot arm is movable between an extended position in which the mounting structure is along the arm pivot axis relative to the gravitational direction, and a retracted position in which the mounting structure is below the arm pivot axis relative to the gravitational direction, and
an actuator configured to be manually operated, by an operator located on the underlying surface, to selectively move the pivot arm between the extended position and the retracted position;
securing the base to the upper first pole end;
providing a second pole extending from a proximal second pole end to a distal second pole end; and
securing the proximal second pole end to the pivot arm, such that the second pole is oriented along the gravitational direction above the first pole when the pivot arm is in the extended position, and the distal second pole end is located below the arm pivot axis when the pivot arm is in the retracted position.

22. The method of claim 21, wherein the distal second pole end is positioned to be serviced by an operator located on the underlying surface when the pivot arm is in the retracted position.

23. The method of claim 21, wherein the pivot arm is angularly displaced by more than 90 degrees about the arm pivot axis between the extended position and the retracted position.

24. The method of claim 21, wherein the pivot arm is angularly displaced by at least 110 degrees about the arm pivot axis between the extended position and the retracted position.

25. The method of claim 21, wherein the pivot arm is angularly displaced by at least 135 degrees about the arm pivot axis between the extended position and the retracted position.

26. The method of claim 21, further comprising manually operating the actuator from a position on the underlying surface adjacent the lower first pole end to move the pivot arm from the retracted position to the extended position.

27. The method of claim 26, further comprising installing one or more items of electrical equipment onto the distal second pole end prior to operating the actuator from the position on the underlying surface adjacent the lower first pole end to move the pivot arm from the retracted position to the extended position.

\* \* \* \* \*